(12) United States Patent
Tanaka (10) Patent No.: US 8,978,808 B2
(45) Date of Patent: Mar. 17, 2015

(54) MOTORCYCLE

(71) Applicant: Yamaha Hatsudoki Kabushiki Kaisha, Iwata-shi, Shizuoka (JP)

(72) Inventor: Tooru Tanaka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/018,551

(22) Filed: Sep. 5, 2013

(65) Prior Publication Data

US 2014/0291958 A1    Oct. 2, 2014

(30) Foreign Application Priority Data

Mar. 26, 2013   (JP) .................................. 2013-065053

(51) Int. Cl.
   *B62J 1/12*      (2006.01)
   *B62K 11/00*     (2006.01)
   *B62H 5/00*      (2006.01)
   *B62K 19/46*     (2006.01)

(52) U.S. Cl.
   CPC ................ *B62K 11/00* (2013.01); *B62H 5/006* (2013.01); *B62J 1/12* (2013.01); *B62K 19/46* (2013.01)
   USPC ........................................................ 180/219

(58) Field of Classification Search
   CPC .............. B62J 1/12; B62H 5/00; B62H 5/006
   USPC ........................................................ 180/219
   See application file for complete search history.

(56) References Cited

U.S. PATENT DOCUMENTS

| 3,779,597 | A | * | 12/1973 | Uchida | ...................... | 296/37.15 |
| 4,594,866 | A | * | 6/1986 | Neyret | ............................. | 70/455 |
| 5,044,646 | A | * | 9/1991 | Iiga et al. | ...................... | 180/219 |
| 5,465,882 | A | * | 11/1995 | Shinohara | ..................... | 224/413 |
| 5,560,445 | A | * | 10/1996 | Saito et al. | ..................... | 180/219 |
| 6,237,710 | B1 | * | 5/2001 | Mori et al. | .................... | 180/219 |
| 6,497,300 | B2 | * | 12/2002 | Mori et al. | .................... | 180/219 |
| 6,595,033 | B1 | * | 7/2003 | Hara et al. | ...................... | 70/370 |
| 6,623,071 | B2 | * | 9/2003 | Kawamoto et al. | ...... | 297/195.13 |

(Continued)

FOREIGN PATENT DOCUMENTS

| DE | 100 42 630 A1 | 3/2001 |
| JP | 05-016851 A | 1/1993 |

(Continued)

OTHER PUBLICATIONS

Official Communication issued in corresponding European Patent Application No. 13185889.6, mailed on Dec. 6, 2013.

*Primary Examiner* — Kevin Hurley
*Assistant Examiner* — Michael Stabley
(74) *Attorney, Agent, or Firm* — Keating & Bennett, LLP (57) ABSTRACT

A motorcycle includes a seat located above the right and left seat frames, a first engagement portion disposed at an underside of the seat, a housing box located below the seat and supported by the right and left seat frames, a key cylinder attached to a lower surface of the housing box and provided with a downwardly-opened key insertion hole, and a seat lock disposed between the lower surface of the housing box and the seat and provided with a second engagement portion to engage with the first engagement portion. The key cylinder comes into contact with the seat lock to cause the seat lock to slide by rotation of a key inserted into the key insertion hole, thus releasing the engagement between the first engagement portion and second engagement portion.

17 Claims, 12 Drawing Sheets

(56) References Cited

U.S. PATENT DOCUMENTS

| | | | |
|---|---|---|---|
| 6,860,359 B2* | 3/2005 | Tanabe et al. | 180/309 |
| 7,290,632 B2* | 11/2007 | Hanagan | 180/219 |
| 7,556,114 B2* | 7/2009 | Hanagan | 180/219 |
| 8,459,393 B2* | 6/2013 | Yamamoto | 180/219 |
| 2010/0171326 A1* | 7/2010 | Bacon | 292/336.3 |

FOREIGN PATENT DOCUMENTS

| | | |
|---|---|---|
| JP | 10-167141 A | 6/1998 |
| JP | 2004-011257 A | 1/2004 |
| JP | 2012-025273 A | 2/2012 |
| JP | 2012-046015 A | 3/2012 |

* cited by examiner

MOTORCYCLE

The present application claims priority to Patent Application No. 2013-65053 filed in Japan on Mar. 26, 2013, the entire contents of which are hereby incorporated by reference.

BACKGROUND OF THE INVENTION

1. Field of the Invention

The present invention relates to motorcycles.

2. Description of the Related Art

In some motorcycles, a housing box that houses articles (such as a helmet, for example) is provided below a seat. A seat functions as a lid for such a housing box. Some seats are configured so as to be detached directly from vehicle bodies, while others are configured so that front portions thereof are attached to vehicle bodies via hinges in an openable and closable manner. In either case, the seat is fixed to the vehicle body by a seat lock mechanism. The seat is released by inserting a key into a key cylinder attached to the vehicle body and rotating the key.

For example, as disclosed in JP-A-2004-11257 and JP-A-2012-46015, a motorcycle including a seat lock mechanism of this type is known. From the viewpoint of improving an outer appearance and preventing the inflow of rainwater or the like, a known motorcycle employs a structure in which a key cylinder is attached below a seat and a key is inserted into the key cylinder upwardly from below the seat.

However, in the technique disclosed in JP-A-2004-11257 and JP-A-2012-46015, the key cylinder into which the key is to be inserted and the seat lock mechanism are spaced apart from each other. Therefore, the key cylinder and the seat lock mechanism have to be connected to each other through a wire cable so that a force to release the seat is transmitted to the seat lock mechanism via the wire cable. Since the wire cable is used, the number of components is increased, and in addition, space in which to dispose the wire cable is necessary. Besides, the arrangement of components can be complicated.

SUMMARY OF THE INVENTION

Accordingly, preferred embodiments of the present invention provide a motorcycle that is able to release a seat by using a simple structure.

A motorcycle according to a preferred embodiment of the present invention includes a head pipe; a body frame including a main frame that extends obliquely downward and rearward from the head pipe, a left seat frame that extends obliquely upward and rearward from the main frame, and a right seat frame that extends obliquely upward and rearward from the main frame and is located rightward of the left seat frame; a seat located above the right and left seat frames; a first engagement portion disposed at an underside of the seat; a housing box located below the seat and supported by the right and left seat frames; a key cylinder attached to a lower surface of the housing box and provided with a key insertion hole opened downward; and a seat lock disposed between the lower surface of the housing box and the seat and provided with a second engagement portion to be engaged with the first engagement portion. The key cylinder is configured so as to be brought into contact with the seat lock to cause the seat lock to slide by rotation of a key inserted into the key insertion hole, thus releasing the engagement between the first engagement portion and the second engagement portion.

In the motorcycle according to the present preferred embodiment, the key cylinder, the key insertion hole of which opens downward, is attached to the lower surface of the housing box. Therefore, inflow of rainwater or the like into the key insertion hole is prevented, and in addition, degradation in the outer appearance of the motorcycle is prevented. By rotating the key inserted into the key insertion hole, the key cylinder and the seat lock are brought into direct contact with each other, and the key cylinder causes the seat lock to slide. This releases the engagement between the first engagement portion disposed at the underside of the seat and the second engagement portion of the seat lock, thus making it possible to release the seat. In this manner, the motorcycle is able to release the seat with a simple structure without using any wire cable.

According to a preferred embodiment of the present invention, the key cylinder preferably includes a cylindrical or substantially cylindrical main body provided with the key insertion hole, and a protrusion that protrudes horizontally from an upper end of the main body and is rotated around the main body by rotation of the key inserted into the key insertion hole. The seat lock preferably includes a catch portion that can be caught by the protrusion. The protrusion is preferably configured so as to catch the catch portion of the seat lock to cause the seat lock to slide by rotation of the key inserted into the key insertion hole, thus releasing the engagement between the first engagement portion and the second engagement portion.

The protrusion of the key cylinder catches the catch portion of the seat lock and causes the seat lock to slide by rotation of the key inserted into the key insertion hole. This releases the engagement between the first engagement portion disposed at the underside of the seat and the second engagement portion of the seat lock, thus making it possible to release the seat.

According to a preferred embodiment of the present invention, the motorcycle preferably further includes a cover disposed below the key cylinder.

Thus, it is possible to prevent water, mud, dust, etc. which are spattered during running of the motorcycle from going into the key insertion hole of the key cylinder.

According to a preferred embodiment of the present invention, the motorcycle preferably further includes a spring that exerts an urging force on the cover to urge the cover toward the key insertion hole. The cover is preferably configured so as to open and close the key insertion hole.

Thus, when the seat is to be released, the key insertion hole can be exposed to the outside by opening the cover. Normally, the cover closes the key insertion hole due to the urging force of the spring.

According to a preferred embodiment of the present invention, the housing box preferably includes a housing space located forward of the key cylinder.

Thus, the key cylinder is provided in a limited region located rearward of the housing space, thus allowing the key cylinder to be disposed in a compact manner.

According to a preferred embodiment of the present invention, the motorcycle preferably further includes a rear wheel disposed below the right and left seat frames, and a rear fender disposed below the right and left seat frames and above a portion of the rear wheel. The key cylinder is preferably disposed rearward of a rear end of the rear fender.

Since the rear fender is not disposed directly below the key cylinder, it is easy to insert the key into the key insertion hole and to rotate the key inserted into the key cylinder.

According to a preferred embodiment of the present invention, the key cylinder is preferably disposed on a vehicle center line.

Since the key cylinder is disposed on the vehicle center line, the key cylinder is easily accessible from both a position rightward of the motorcycle and a position leftward of the motorcycle.

As described above, various preferred embodiments of the present invention provide a motorcycle that is able to release a seat by using a simple structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
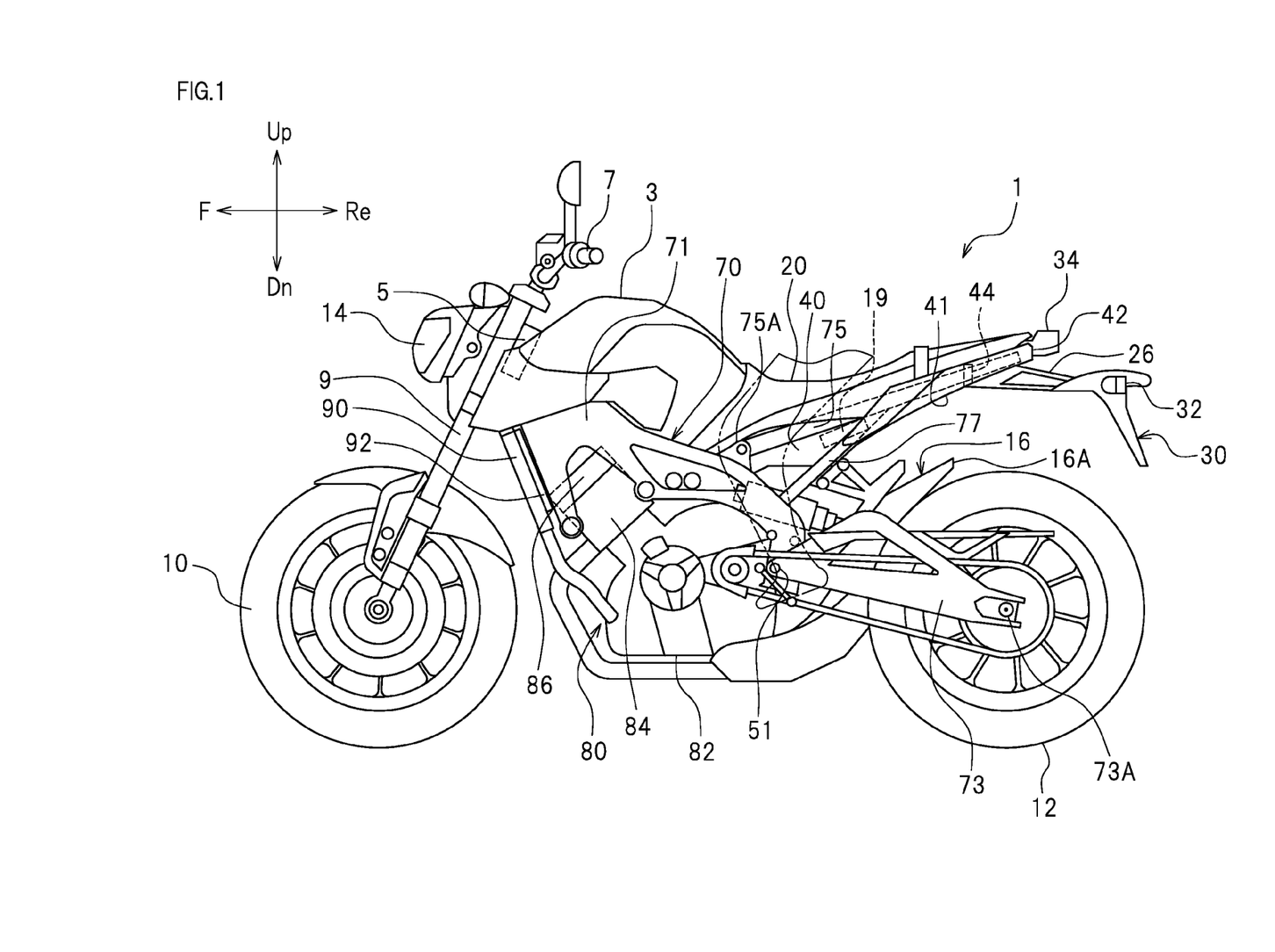
FIG. 1 is a left side view illustrating a motorcycle according to a preferred embodiment of the present invention.

Hereinafter, preferred embodiments of the present invention will be described. As illustrated in FIG. 1, a motorcycle (vehicle) according to the present preferred embodiment preferably is a "street type" motorcycle 1, for example. Note that the motorcycle according to the preferred embodiments of the present invention is not limited to the "street type" motorcycle 1. The motorcycle according to preferred embodiments of the present invention may be any other type of motorcycle such as a "moped type", "off-road type" or "scooter type" motorcycle, for example.

In the following description, "front", "rear", "right" and "left" indicate front, rear, right and left with respect to a rider of the motorcycle 1, respectively. Reference signs "F", "Re", "R" and "L" used in the drawings represent front, rear, right and left, respectively. Furthermore, "up" and "down" indicate an upward direction and a downward direction when the motorcycle 1 is brought to a stop on a horizontal plane, respectively. Reference signs "Up" and "Dn" used in the drawings represent "vertically upward" and "vertically downward", respectively.

Figure 2:
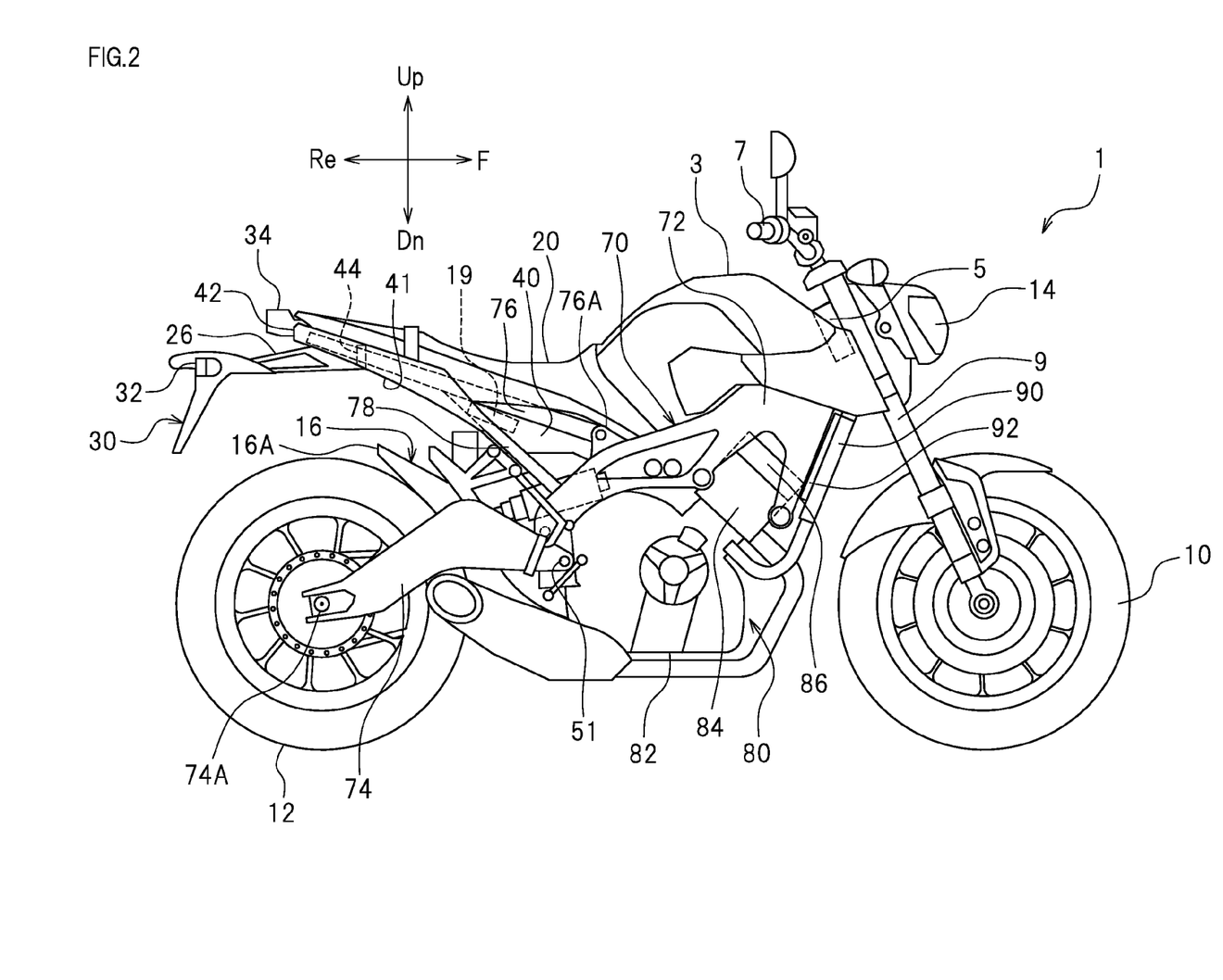
FIG. 2 is a right side view illustrating the motorcycle according to a preferred embodiment of the present invention.

As illustrated in FIGS. 1 and 2, the motorcycle 1 preferably includes a fuel tank 3, a seat 20, an engine 80 that is preferably an internal combustion engine, and a body frame 70 that supports these components. A head pipe 5 is provided forward of the body frame 70. A headlight 14 is disposed forward of the head pipe 5. The head pipe 5 supports a steering shaft (not illustrated). A handlebar 7 is provided at an upper portion of the steering shaft. A front fork 9 is provided at a lower portion of the steering shaft. A front wheel 10 is rotatably supported by a lower end portion of the front fork 9.

The body frame 70 preferably includes a left main frame 71, a right main frame 72 (see FIG. 2), a left rear arm 73, a right rear arm 74 (see FIG. 2), and a cross member (not illustrated). As illustrated in FIG. 1, the left main frame 71 extends obliquely downward and rearward from the head pipe 5. The left main frame 71 and the left rear arm 73 are connected to each other via a pivot shaft 51. As illustrated in FIG. 2, the right main frame 72 extends obliquely downward and rearward from the head pipe 5 and is located rightward of the left main frame 71. The right main frame 72 and the right rear arm 74 are connected to each other via the pivot shaft 51. The cross member runs between the left main frame 71 and the right main frame 72. The left main frame 71 and the right main frame 72 are preferably molded of aluminum, for example.

As illustrated in FIG. 1, the body frame 70 preferably further includes a left seat frame 75 that extends obliquely upward and rearward from a position somewhere along the left main frame 71, and a left back stay 77 that extends obliquely upward and rearward from the left main frame 71 at a position located rearward of the left seat frame 75. The left main frame 71 preferably includes a left connection portion 75A connected to the left seat frame 75. The left seat frame 75 and the left back stay 77 are connected to each other at a position located rearward of the left main frame 71. As illustrated in FIG. 2, the body frame 70 preferably further includes a right seat frame 76 that extends obliquely upward and rearward from a position somewhere along the right main frame 72, and a right back stay 78 that extends obliquely upward and rearward from the right main frame 72 at a position located rearward of the right seat frame 76. The right main frame 72 preferably includes a right connection portion 76A connected to the right seat frame 76. The right seat frame 76 and the right back stay 78 are connected to each other at a position located rearward of the right main frame 72. The left seat frame 75 and the right seat frame 76 each preferably have a pipe shape.

As illustrated in FIG. 1, the engine 80 is disposed below the left main frame 71 and the right main frame 72 (see FIG. 2). The engine 80 is supported by the left main frame 71 and the right main frame 72 so as not to be swingable. The engine 80 preferably includes a crankcase 82, a cylinder block 84 that extends obliquely upward and forward from the crankcase 82, a cylinder head 86 connected to an upper portion of the cylinder block 84, and a cylinder head cover (not illustrated) connected to an upper portion of the cylinder head 86.

A radiator 90 is disposed forward of the engine 80. A radiator fan 92 is disposed between the engine 80 and the radiator 90. The radiator fan 92 allows air to pass through the radiator 90 from a region forward of the radiator 90 in a forced manner.

Figure 3:
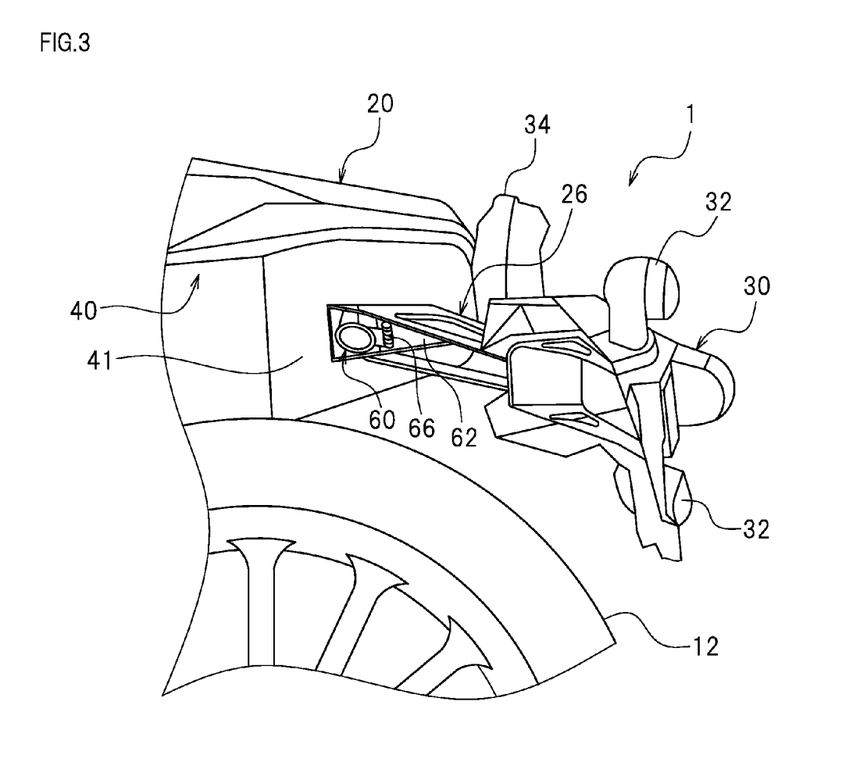
FIG. 3 is a perspective view illustrating a rear portion of the motorcycle according to a preferred embodiment of the present invention.

A rear wheel 12 is rotatably supported by a rear end portion 73A of the left rear arm 73 and a rear end portion 74A (see FIG. 2) of the right rear arm 74 (see FIG. 2). The rear wheel 12 is disposed below the left seat frame 75 and the right seat frame 76 (see FIG. 2). A rear fender 16 is disposed above a portion of the rear wheel 12. The rear fender 16 is disposed below the left seat frame 75 and the right seat frame 76. The rear fender 16 is supported by the left rear arm 73 and the right rear arm 74. A mud guard 30 is disposed rearward of the seat 20. As illustrated in FIG. 3, the mud guard 30 is connected via a connector 26 to a housing box 40 which will be described below. The connector 26 is attached to a lower surface 41 of the housing box 40. At least a portion of the connector 26 is located rearward of a rear end 42 (see FIGS. 1 and 2) of the housing box 40. A pair of right and left tail lamps 32 are attached to a rear portion of the mud guard 30.

Figure 4:
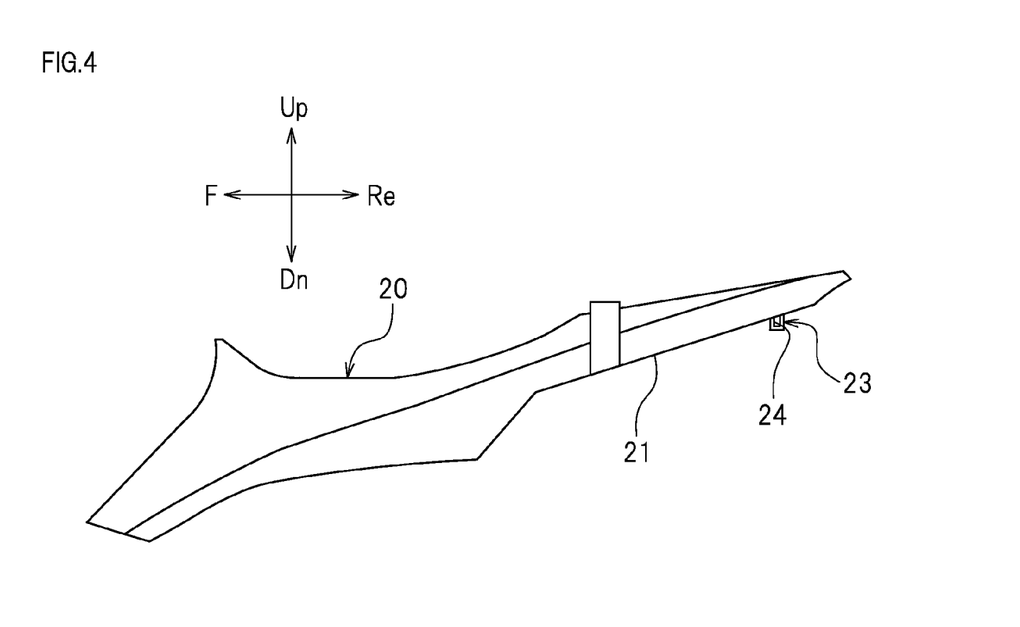
FIG. 4 is a left side view illustrating a seat according to a preferred embodiment of the present invention.
Figure 5:
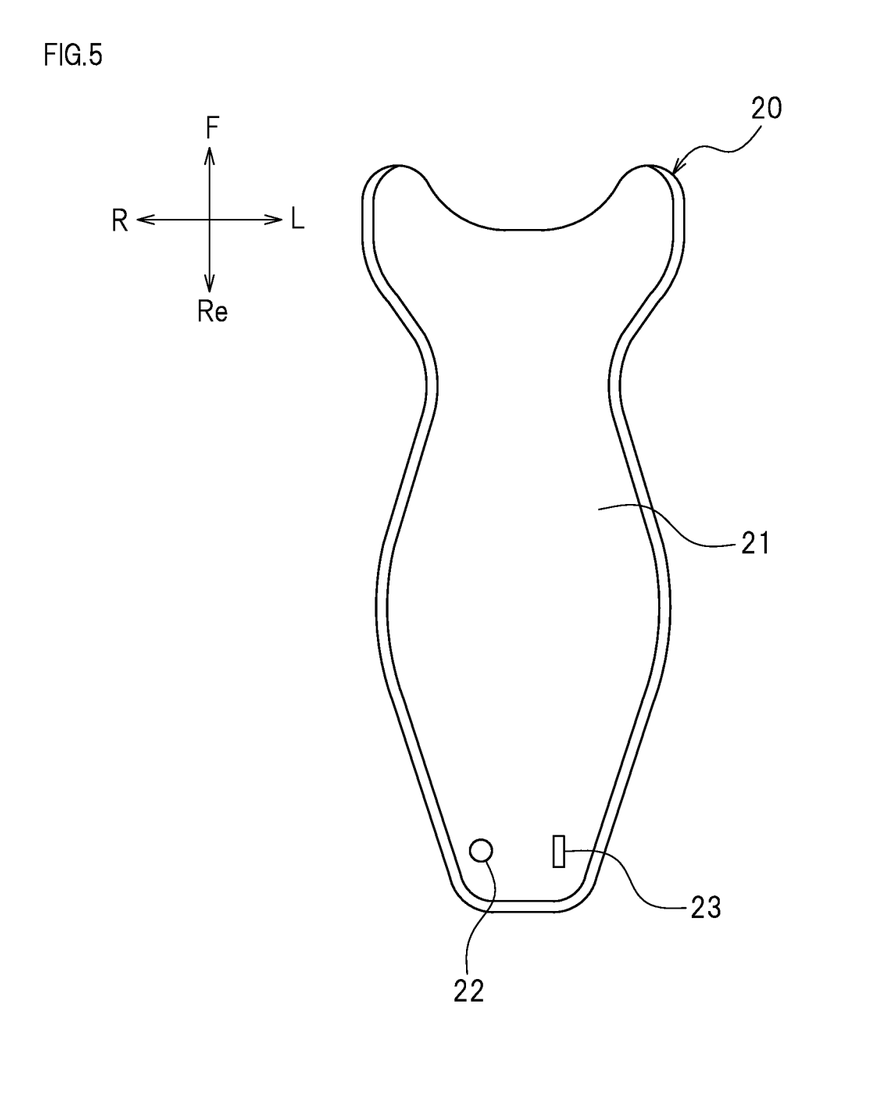
FIG. 5 is a plan view illustrating an underside of the seat according to a preferred embodiment of the present invention.

As illustrated in FIG. 1, the seat 20 is located above the left seat frame 75 and the right seat frame 76 (see FIG. 2) of the body frame 70. The seat 20 is supported by the left seat frame 75 and the right seat frame 76. As illustrated in FIG. 5, the seat 20 preferably includes a cylindrical or substantially cylindrical protrusion 22 that protrudes downward from an underside 21 of the seat 20, and a rectangular or substantially rectangular lock portion 23 (first engagement portion) that protrudes downward from the underside 21 of the seat 20. The protrusion 22 and the lock portion 23 are preferably provided at a rear portion of the seat 20. The protrusion 22 and the lock portion 23 are preferably located so as to be aligned in a vehicle width direction. As illustrated in FIG. 4, the lock portion 23 preferably includes a through hole 24 that preferably passes therethrough in the vehicle width direction.

Figure 6:
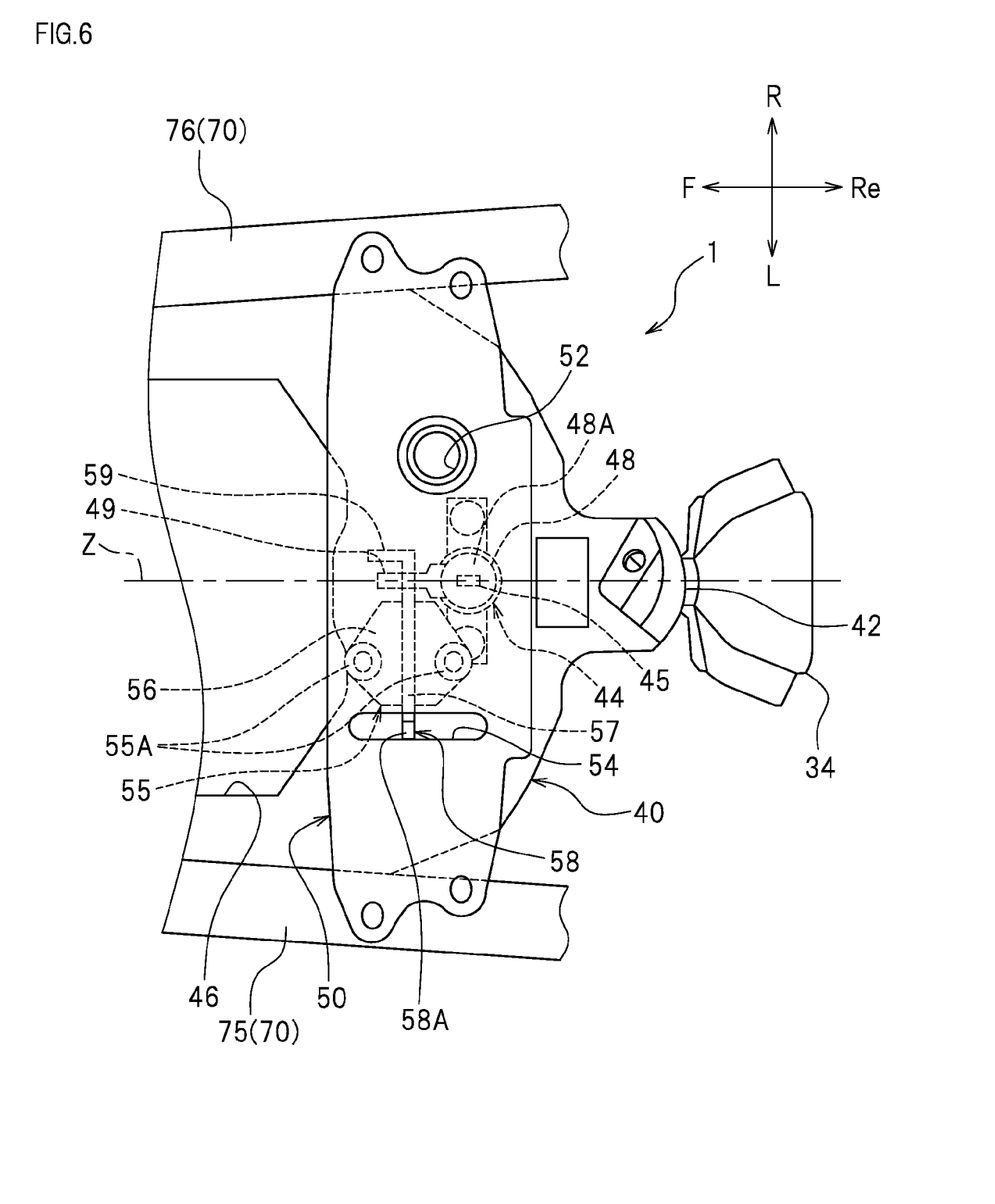
FIG. 6 is a plan view partially illustrating a housing box according to a preferred embodiment of the present invention.

As illustrated in FIGS. 1 and 2, the housing box 40 is disposed below the seat 20. The housing box 40 preferably includes a housing space 46 (see FIG. 6) located forward of a key cylinder 44 which will be described below. A battery 19 is disposed in the housing space 46 of the housing box 40. As illustrated in FIG. 6, the housing box 40 is disposed between the left seat frame 75 and the right seat frame 76. The housing box 40 is supported by the left seat frame 75 and the right seat frame 76. A tail lamp 34 is disposed at the rear end 42 of the housing box 40.

As illustrated in FIG. 6, a flat plate 50 running between the left seat frame 75 and the right seat frame 76 is disposed above the housing box 40. The flat plate 50 is provided with a circular or substantially circular opening 52 into which the protrusion 22 of the seat 20 is fitted. The flat plate 50 is further provided with an oblong opening 54 into which the lock portion 23 of the seat 20 is inserted. The lock portion 23 that is fitted into the opening 54 is engaged with a seat lock 55 which will be described below. More specifically, an engagement portion 58 (second engagement portion) of the seat lock 55 is fitted into the through hole 24 (see FIG. 4) of the lock portion 23.

Figure 8:
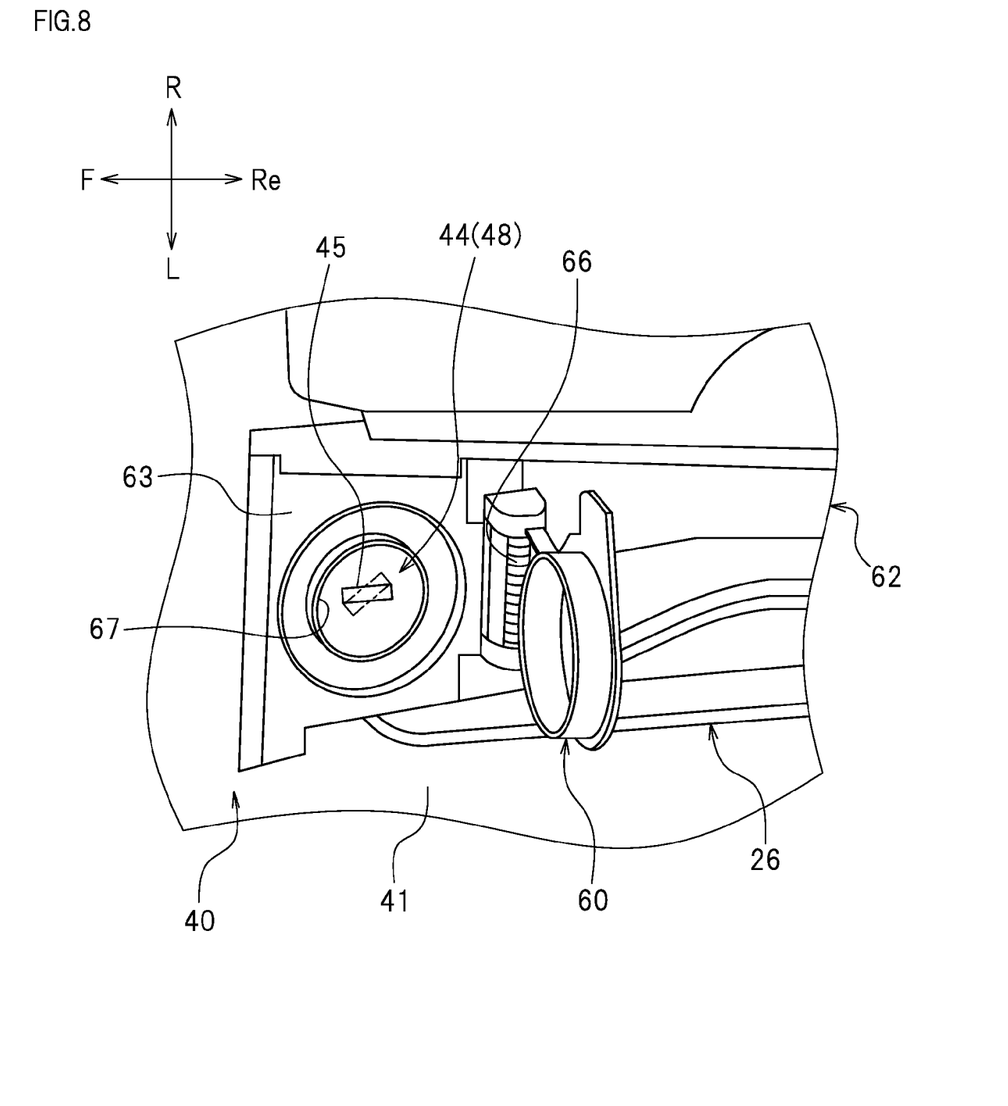
FIG. 8 is a perspective view illustrating a key cylinder and a cover according to a preferred embodiment of the present invention.
Figure 10:
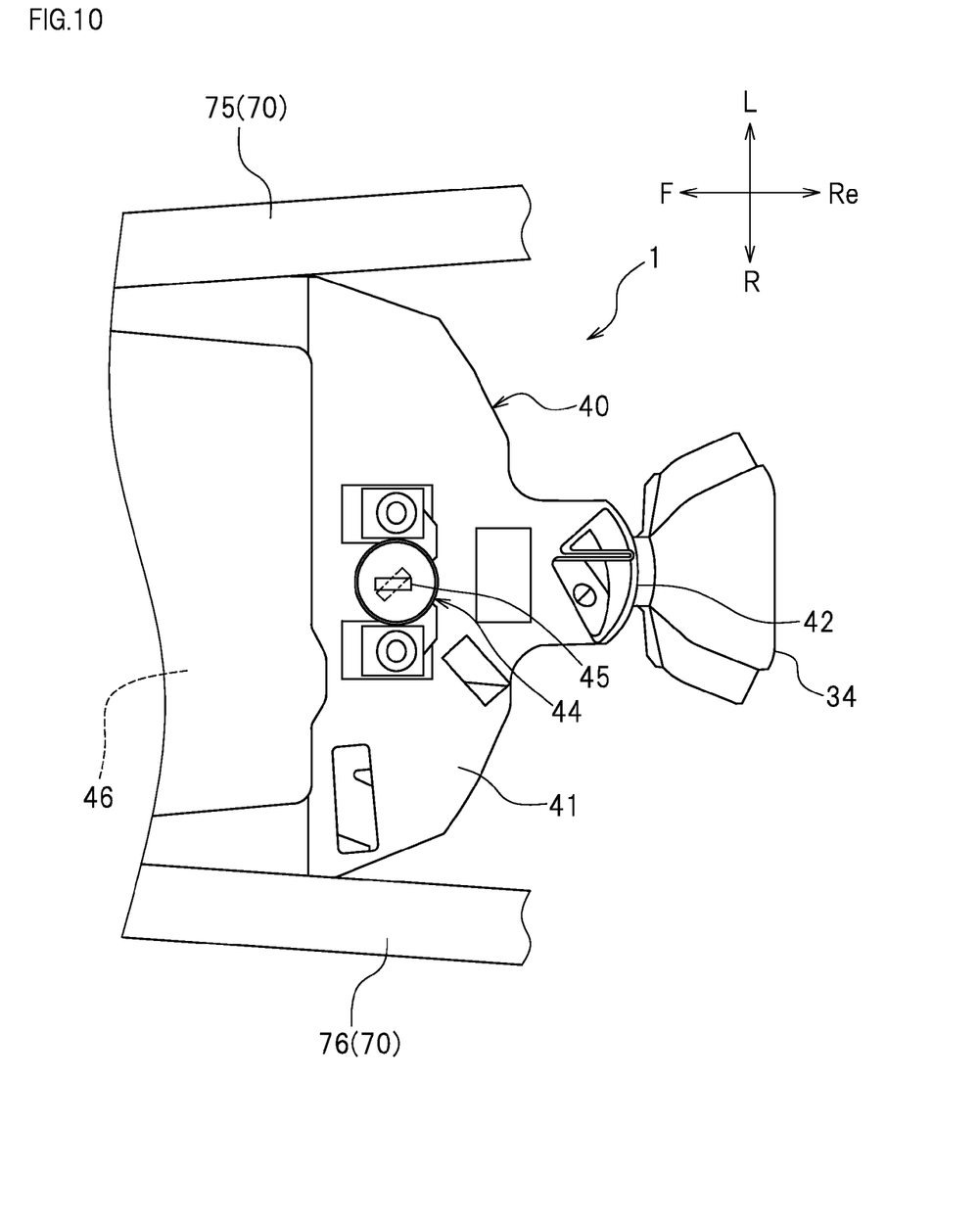
FIG. 10 is a bottom view partially illustrating the housing box according to a preferred embodiment of the present invention.

As illustrated in FIG. 8, the key cylinder 44 is attached to the lower surface 41 of the housing box 40. A key insertion hole 45 of the key cylinder 44 preferably opens downward (see FIG. 10). The key cylinder 44 is disposed at a connection between the housing box 40 and the connector 26. As illustrated in FIGS. 1 and 2, the key cylinder 44 is disposed rearward of a rear end 16A of the rear fender 16. As illustrated in FIG. 6, the key cylinder 44 is disposed on a vehicle center line Z.

As used herein, the term "vehicle center line Z" refers to a line that extends in a fore-and-aft direction so as to pass through a lateral (width) center of the front wheel 10 and a lateral (width) center of the rear wheel 12 in a plan view of the motorcycle 1.

As illustrated in FIG. 6, the key cylinder 44 preferably includes a main body 48 and a protrusion 49. The main body 48 preferably has a cylindrical or substantially cylindrical shape. The main body 48 preferably includes the key insertion hole 45. The protrusion 49 protrudes horizontally from an upper end 48A of the main body 48. The protrusion 49 is located below a movable portion 57 of the seat lock 55 which will be described below. Normally, i.e., when a key (not illustrated) is not inserted into the key insertion hole 45, the protrusion 49 extends toward the front of the vehicle. By rotating the key inserted into the key insertion hole 45, the protrusion 49 is rotated around the main body 48 in directions indicated by arrows P1 and P2 in FIG. 7.

Figure 9:
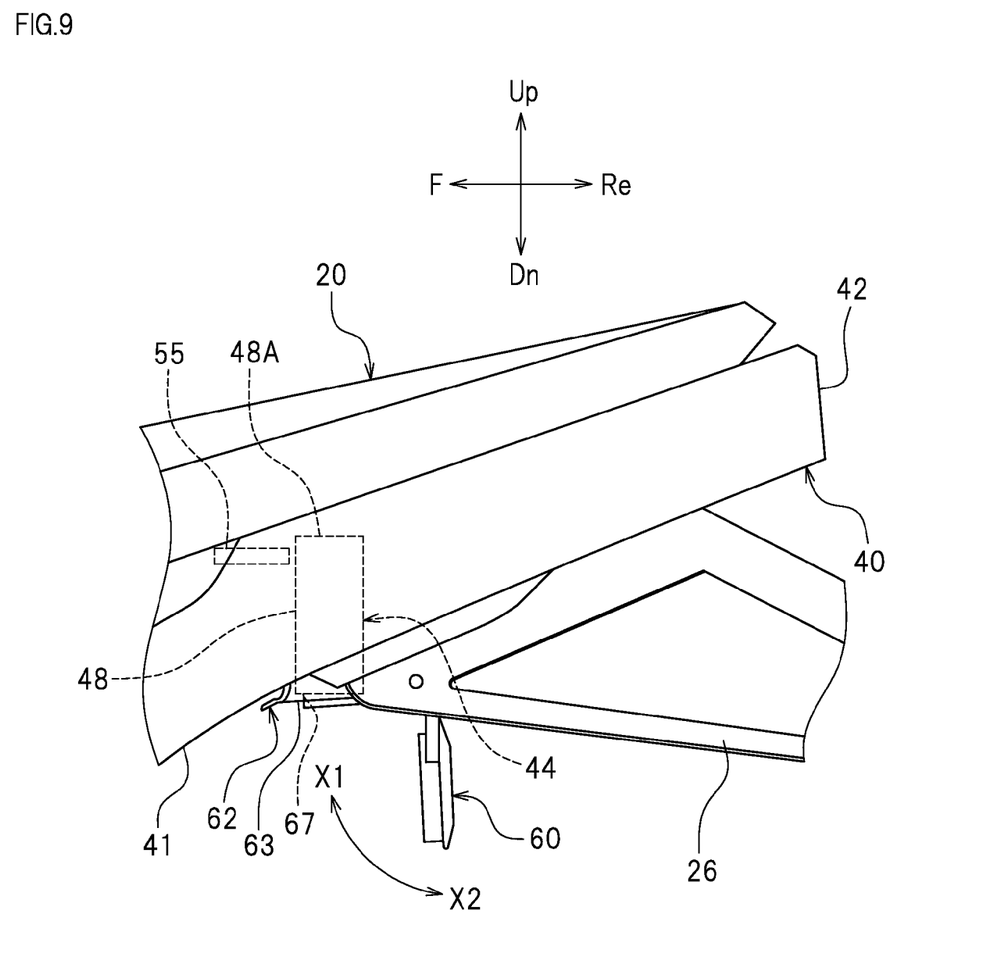
FIG. 9 is a left side view illustrating the rear portion of the motorcycle according to a preferred embodiment of the present invention.

As illustrated in FIG. 9, the seat lock 55 is disposed between the lower surface 41 of the housing box 40 and the seat 20. The seat lock 55 may be disposed inside the housing box 40. As illustrated in FIG. 6, the seat lock 55 preferably includes a main body 56 that is attached to the flat plate 50, and the movable portion 57 that is preferably L-shaped or substantially L-shaped in the plan view and slidable with respect to the main body 56. The movable portion 57 preferably includes the engagement portion 58 to be engaged with the lock portion 23 (see FIG. 4) of the seat 20. The engagement portion 58 is provided with an inclined surface 58A that is inclined downward toward a tip of the engagement portion 58. The movable portion 57 preferably further includes a catch portion 59 that engages the protrusion 49 of the key cylinder 44. The catch portion 59 extends downward. The seat lock 55 preferably includes connection portions 55A attached to the flat plate 50. Normally, i.e., when the movable portion 57 does not move in the vehicle width direction, the engagement portion 58 overlaps with the opening 54 in the plan view. A spring (not illustrated) exerts an urging force on the movable portion 57 so that the movable portion 57 is urged in a direction indicated by an arrow Q2 in FIG. 7.

Figure 7:
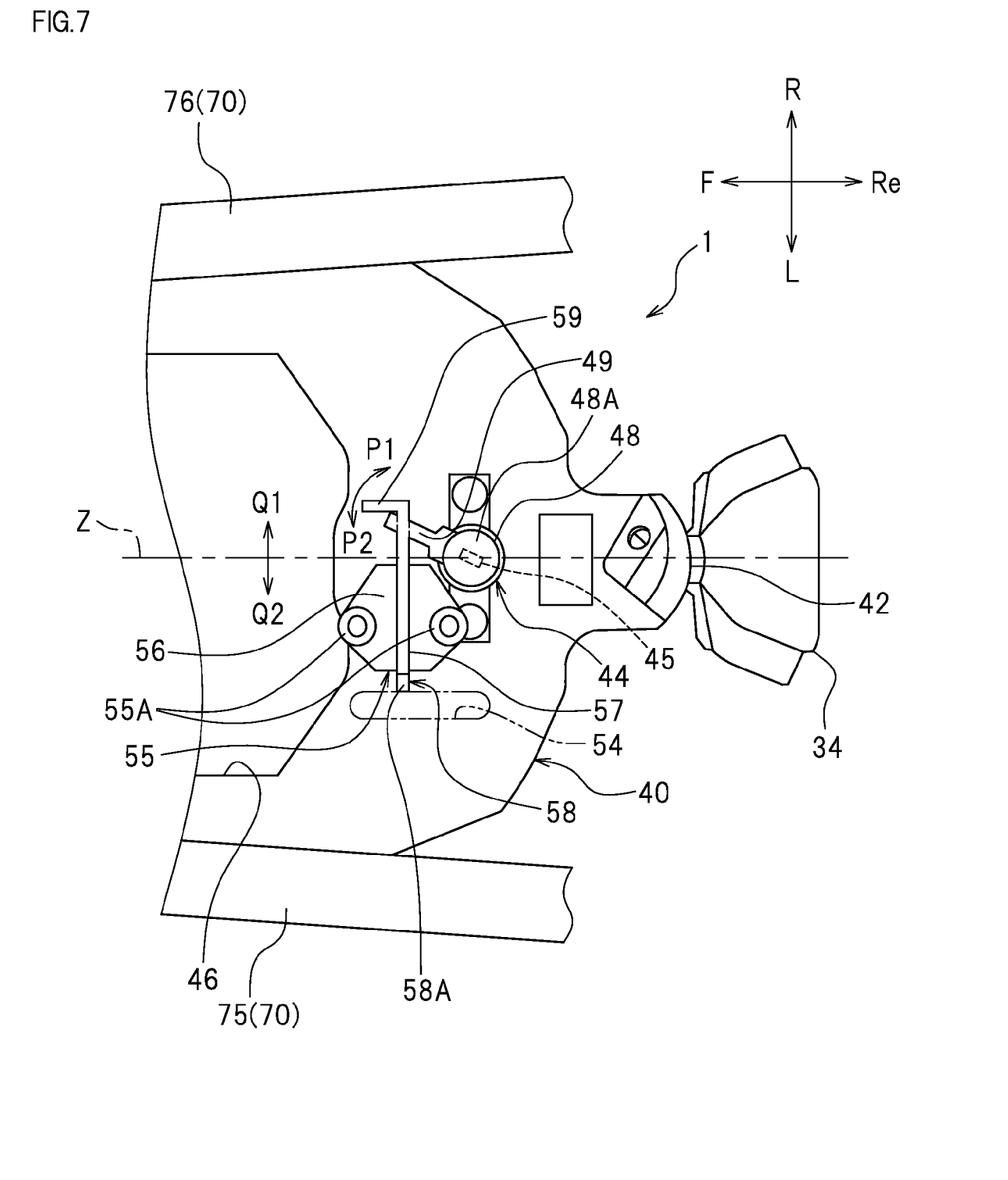
FIG. 7 is a plan view partially illustrating the housing box according to a preferred embodiment of the present invention.

As illustrated in FIG. 7, the protrusion 49 is moved in the direction indicated by the arrow P1 in FIG. 7 by rotation of the key (not illustrated) inserted into the key insertion hole 45. The protrusion 49 catches the catch portion 59 of the seat lock 55 and causes the movable portion 57 of the seat lock 55 to slide in a direction indicated by an arrow Q1 in FIG. 7. When the movable portion 57 slides in the direction indicated by the arrow Q1 in FIG. 7, the engagement portion 58 of the movable portion 57 also slides in the direction indicated by the arrow Q1 in FIG. 7. Hence, engagement between the engagement portion 58 and the lock portion 23 (see FIG. 4) of the seat 20 is released. In this case, the engagement portion 58 and the opening 54 do not overlap with each other in the plan view. As a result, the seat 20 can be detached from the housing box 40. As described above, in the present preferred embodiment, no wire cable is interposed between the key cylinder 44 and the seat lock 55, and an operation performed on the key cylinder 44 is directly transmitted to the seat lock 55.

Conversely, when the protrusion 49 is moved in the direction indicated by the arrow P2 in FIG. 7 by rotation of the key (not illustrated) inserted into the key insertion hole 45, the movable portion 57 is moved in the direction indicated by the arrow Q2 in FIG. 7 by the spring (not illustrated). Thus, as illustrated in FIG. 6, the engagement portion 58 overlaps with the opening 54 in the plan view. When the lock portion 23 (see FIG. 4) of the seat 20 is inserted into the opening 54 from above, the lock portion 23 comes into contact with the inclined surface 58A of the engagement portion 58, and the engagement portion 58 is pressed rightward by the lock portion 23. Thus, the lock portion 23 causes the movable portion 57 to move in the direction indicated by the arrow Q1 in FIG. 7. When the lock portion 23 is moved to reach an underside of the engagement portion 58 obliquely opposite to the inclined surface 58A thereof and the lock portion 23 is completely inserted into the opening 54, the movable portion 57 is moved in the direction indicated by the arrow Q2 due to the urging force of the spring exerted in the direction indicated by the arrow Q2, and the engagement portion 58 is engaged with the through hole 24 (see FIG. 4) of the lock portion 23. As a result, the seat 20 is fixed to the housing box 40.

Figure 11:
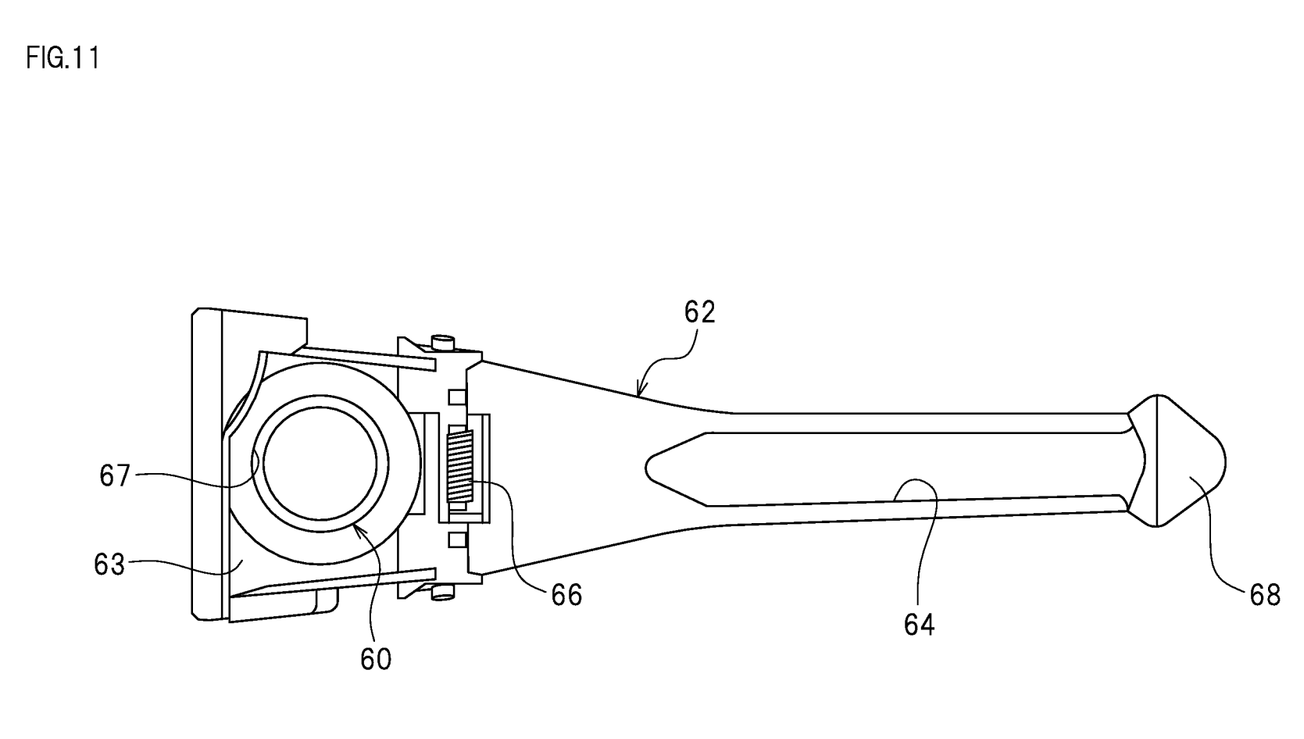
FIG. 11 is a plan view illustrating a protector according to a preferred embodiment of the present invention.
Figure 12:
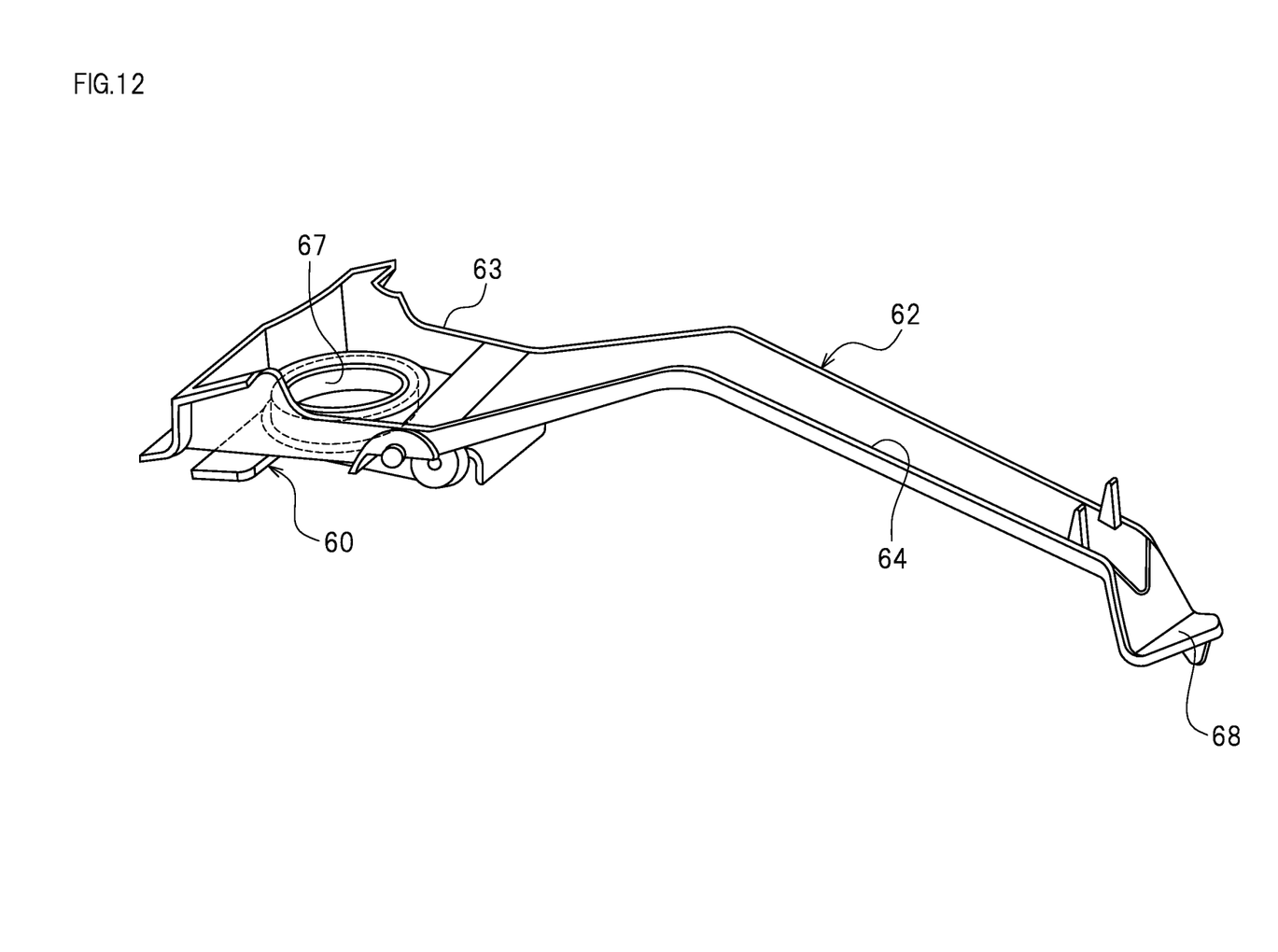
FIG. 12 is a perspective view illustrating the protector according to a preferred embodiment of the present invention.

As illustrated in FIG. 3, a protector 62 is disposed at the lower surface 41 of the housing box 40. The protector 62 protects wiring (not illustrated) through which the battery 19 (see FIGS. 1 and 2) disposed inside the housing box 40 and the tail lamps 32 attached to the mud guard 30 are connected to each other. As illustrated in FIG. 11, a container 64 that contains the wiring is provided in the protector 62 so that the container 64 extends along a longitudinal direction of the protector 62. As illustrated in FIG. 3, the connector 26 is disposed above the container 64, and the wiring is disposed between the container 64 and the connector 26. A rear portion 68 (see FIG. 11) of the protector 62 is attached to the mud guard 30. As illustrated in FIG. 9, an opening 67 is provided in a region of a front portion 63 of the protector 62 located below the key cylinder 44. In the plan view of the vehicle, the opening 67 and the key insertion hole 45 overlap with each other, and the key insertion hole 45 is exposed to the outside through the opening 67. A cover 60 that covers the key insertion hole 45 (see FIG. 8) of the key cylinder 44 is disposed below the key cylinder 44. As illustrated in FIG. 12, the cover 60 is attached to the front portion 63 of the protector 62. The cover 60 covers the opening 67. The cover 60 is attached to the protector 62 via a spring 66. The spring 66 exerts an urging force on the cover 60 to urge the cover 60 toward the key insertion hole 45 (i.e., in a direction indicated by an arrow X1 in FIG. 9). The cover 60 is configured so as to open and close the key insertion hole 45. Specifically, upon movement of the cover 60 in the direction indicated by the arrow X1 in FIG. 9, the key insertion hole 45 is covered with the cover 60. Conversely, upon movement of the cover 60 in a direction indicated by an arrow X2 in FIG. 9, the key insertion hole 45 is exposed to the outside.

As described above, in the motorcycle 1 according to the present preferred embodiment, the key cylinder 44, the key insertion hole 45 of which opens downward, is attached to the lower surface 41 of the housing box 40. Therefore, the inflow of rainwater or the like into the key insertion hole 45 is prevented, and in addition, degradation in the outer appearance of the motorcycle 1 is prevented. By rotating the key inserted into the key insertion hole 45, the key cylinder 44 and the seat lock 55 are brought into direct contact with each other, and the key cylinder 44 causes the movable portion 57 of the seat lock 55 to slide. This releases the engagement between the through hole 24 of the lock portion 23 disposed at the underside 21 of the seat 20 and the engagement portion 58 of the seat lock 55, thus making it possible to release the seat 20. In this manner, the motorcycle 1 is capable of releasing the seat 20 with a simple structure without using any wire cable.

In the present preferred embodiment, the movable portion 57 preferably is configured so that the movable portion 57 slides rightward and leftward, but sliding of the movable portion 57 is not limited to any particular direction. For example, the movable portion 57 may be configured so that the movable portion 57 slides forward and rearward. Although the movable portion 57 preferably is configured so that the movable portion 57 slides linearly in the present preferred embodiment, the movable portion 57 may alternatively be configured so that the movable portion 57 slides in a clockwise direction and in a counterclockwise direction. The movable portion 57 is not limited to one that slides within a horizontal plane, but may alternatively be slidable in a direction inclined with respect to a horizontal plane.

According to the present preferred embodiment, the key cylinder 44 preferably includes the cylindrical or substantially cylindrical main body 48 provided with the key insertion hole 45, and the protrusion 49 that protrudes horizontally from the upper end 48A of the main body 48 and rotated around the main body 48 by rotation of the key inserted into the key insertion hole 45. The seat lock 55 preferably includes the catch portion 59 that can be engaged by the protrusion 49. The protrusion 49 is configured so as to catch the catch portion 59 of the seat lock 55 to cause the seat lock 55 to slide by rotation of the key inserted into the key insertion hole 45, thereby releasing the engagement between the through hole 24 of the lock portion 23 disposed at the underside 21 of the seat 20 and the engagement portion 58 of the seat lock 55. Thus, the seat 20 can be released by releasing the engagement between the through hole 24 of the lock portion 23 disposed at the underside 21 of the seat 20 and the engagement portion 58 of the seat lock 55.

According to a preferred embodiment of the present invention, the motorcycle 1 preferably includes the cover 60 disposed below the key cylinder 44. Thus, it is possible to prevent water, mud, dust, etc. which are spattered during running of the motorcycle 1 from going into the key insertion hole 45 of the key cylinder 44.

According to a preferred embodiment of the present invention, the motorcycle 1 preferably includes the spring 66 that exerts an urging force on the cover 60 to urge the cover 60 toward the key insertion hole 45. The cover 60 is configured so as to open and close the key insertion hole 45. Thus, when the seat 20 is to be released, the key insertion hole 45 can be exposed to the outside by opening the cover 60. Normally, the cover 60 closes the key insertion hole 45 due to the urging force of the spring 66.

According to a preferred embodiment of the present invention, the housing box 40 preferably includes the housing space 46 located forward of the key cylinder 44. Thus, the key cylinder 44 is provided in a limited region located rearward of the housing space 46, thus allowing the key cylinder 44 to be disposed in a compact manner.

According to a preferred embodiment of the present invention, the motorcycle 1 preferably includes the rear wheel 12 disposed below the left seat frame 75 and the right seat frame 76, and the rear fender 16 disposed below the left seat frame 75 and the right seat frame 76 and above a portion of the rear wheel 12. The key cylinder 44 is disposed rearward of the rear end 16A of the rear fender 16. Since the rear fender 16 is not disposed directly below the key cylinder 44, it is easy to insert the key into the key insertion hole 45 and to rotate the key inserted into the key insertion hole 45.

Note that when the key cylinder 44 is disposed rearward of the rear end 16A of the rear fender 16, mud, dust, etc. are likely to be spattered toward the key cylinder 44 from the rear wheel 12. Therefore, in this case, the effect obtained when the cover 60 is provided below the key cylinder 44 is more pronounced.

According to a preferred embodiment of the present invention, the key cylinder 44 is disposed on the vehicle center line Z. Since the key cylinder 44 is disposed on the vehicle center line Z, the key cylinder 44 is easily accessible from both a position rightward of the motorcycle 1 and a position leftward of the motorcycle 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motorcycle comprising:
   a head pipe;
   a body frame including a main frame that extends obliquely downward and rearward from the head pipe, a left seat frame that extends obliquely upward and rearward from the main frame, and a right seat frame that extends obliquely upward and rearward from the main frame and is located rightward of the left seat frame;
   a seat located above the right seat frame and the left seat frame;
   a first engagement portion disposed at an underside of the seat;
   a housing box located below the seat and supported by the right seat frame and the left seat frame;
   a key cylinder attached to a lower surface of the housing box and including a key insertion hole opening downward; and
   a seat lock disposed between the lower surface of the housing box and the seat and including a second engagement portion that engages with the first engagement portion;
   a rear wheel disposed below the right seat frame and the left seat frame; and
   a rear fender disposed below the right seat frame and the left seat frame and above a portion of the rear wheel; wherein
   the key cylinder is disposed rearward of a rear end of the rear fender; and
   the key cylinder is configured so as to be brought into direct contact with the seat lock to cause the seat lock to slide by rotation of a key inserted into the key insertion hole, thus releasing an engagement between the first engagement portion and the second engagement portion.

2. The motorcycle according to claim 1, further comprising a cover disposed below the key cylinder.

3. The motorcycle according to claim 2, further comprising a spring that exerts an urging force on the cover to urge the cover toward the key insertion hole, wherein the cover is configured so as to open and close the key insertion hole.

4. The motorcycle according to claim 1, wherein the housing box includes a housing space located forward of the key cylinder.

5. The motorcycle according to claim 1, wherein the key cylinder is disposed on a vehicle center line.

6. A motorcycle comprising:
   a head pipe;
   a body frame including a main frame that extends obliquely downward and rearward from the head pipe, a left seat frame that extends obliquely upward and rearward from the main frame, and a right seat frame that extends obliquely upward and rearward from the main frame and is located rightward of the left seat frame;
   a seat located above the right seat frame and the left seat frame;
   a first engagement portion disposed at an underside of the seat;
   a housing box located below the seat and supported by the right seat frame and the left seat frame;
   a key cylinder attached to a lower surface of the housing box and including a key insertion hole opening downward; and
   a seat lock disposed between the lower surface of the housing box and the seat and including a second engagement portion that engages with the first engagement portion; wherein
   the key cylinder is configured so as to be brought into contact with the seat lock to cause the seat lock to slide by rotation of a key inserted into the key insertion hole, thus releasing an engagement between the first engagement portion and the second engagement portion;
   the key cylinder includes:
     a main body including the key insertion hole; and
     a protrusion that protrudes from the main body and is rotated around the main body by rotation of the key inserted into the key insertion hole;
   the seat lock includes a catch portion that is arranged to be caught by the protrusion; and
   the protrusion is configured so as to catch the catch portion of the seat lock to cause the seat lock to slide by rotation of the key inserted into the key insertion hole, thus releasing the engagement between the first engagement portion and the second engagement portion.

7. The motorcycle according to claim 6, wherein the main body is cylindrical or substantially cylindrical; and
   the protrusion protrudes horizontally from an upper end of the main body.

8. The motorcycle according to claim 6, further comprising a cover disposed below the key cylinder.

9. The motorcycle according to claim 8, further comprising a spring that exerts an urging force on the cover to urge the cover toward the key insertion hole, wherein the cover is configured so as to open and close the key insertion hole.

10. The motorcycle according to claim 6, wherein the housing box includes a housing space located forward of the key cylinder.

11. The motorcycle according to claim 6, further comprising:
    a rear wheel disposed below the right seat frame and the left seat frame; and
    a rear fender disposed below the right seat frame and the left seat frame and above a portion of the rear wheel; wherein
    the key cylinder is disposed rearward of a rear end of the rear fender.

12. The motorcycle according to claim 6, wherein the key cylinder is disposed on a vehicle center line.

13. A motorcycle comprising:
    a head pipe;
    a body frame including a main frame that extends obliquely downward and rearward from the head pipe, a left seat frame that extends obliquely upward and rearward from the main frame, and a right seat frame that extends obliquely upward and rearward from the main frame and is located rightward of the left seat frame;
    a seat located above the right seat frame and the left seat frame;
    a first engagement portion disposed at an underside of the seat;
    a housing box located below the seat and supported by the right seat frame and the left seat frame;
    a key cylinder attached to a lower surface of the housing box and including a key insertion hole opening downward;
    a seat lock disposed between the lower surface of the housing box and the seat and including a second engagement portion that engages with the first engagement portion;
    a rear wheel disposed below the right seat frame and the left seat frame; and
    a rear fender disposed below the right seat frame and the left seat frame and above a portion of the rear wheel; wherein the key cylinder is configured so as to be brought into contact with the seat lock to cause the seat lock to slide by rotation of a key inserted into the key insertion hole, thus releasing an engagement between the first engagement portion and the second engagement portion; and the key cylinder is disposed rearward of a rear end of the rear fender.

14. The motorcycle according to claim 13, further comprising a cover disposed below the key cylinder.

15. The motorcycle according to claim 14, further comprising a spring that exerts an urging force on the cover to urge the cover toward the key insertion hole, wherein the cover is configured so as to open and close the key insertion hole.

16. The motorcycle according to claim 13, wherein the housing box includes a housing space located forward of the key cylinder.

17. The motorcycle according to claim 13, wherein the key cylinder is disposed on a vehicle center line.

* * * * *